(12) United States Patent
Liu et al.

(10) Patent No.: US 7,730,080 B2
(45) Date of Patent: Jun. 1, 2010

(54) TECHNIQUES OF REWRITING DESCENDANT AND WILDCARD XPATH USING ONE OR MORE OF SQL OR, UNION ALL, AND XMLCONCAT() CONSTRUCT

(75) Inventors: Zhen Hua Liu, San Mateo, CA (US); Muralidhar Krishnaprasad, Fremont, CA (US); Hui Joe Chang, Fremont, CA (US); Anand Manikutty, Foster City, CA (US); James W. Warner, Lake Oswago, OR (US); Vikas Arora, San Francisco, CA (US); Susan Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 373 days.

(21) Appl. No.: 11/474,038

(22) Filed: Jun. 23, 2006

(65) Prior Publication Data
US 2007/0299834 A1 Dec. 27, 2007

(51) Int. Cl.
G06F 7/00 (2006.01)
G06F 17/30 (2006.01)
(52) U.S. Cl. .................................. 707/765; 707/760
(58) Field of Classification Search .............. 707/2, 707/4, 5
See application file for complete search history.

(56) References Cited

U.S. PATENT DOCUMENTS

| 5,897,632 | A  | * | 4/1999 | Dar et al. ................... 707/2 |
| 5,950,188 | A  |   | 9/1999 | Wildermuth |
| 6,295,541 | B1 |   | 9/2001 | Bodnar et al. |
| 6,421,658 | B1 | * | 7/2002 | Carey et al. ................. 707/2 |
| 6,526,403 | B1 | * | 2/2003 | Lin et al. .................... 707/4 |
| 6,615,203 | B1 | * | 9/2003 | Lin et al. .................... 707/3 |
| 6,892,210 | B1 |   | 5/2005 | Erickson et al. |
| 7,031,956 | B1 |   | 4/2006 | Lee et al. |

(Continued)

OTHER PUBLICATIONS

Muralidhar Krishnaprasad et al., Proceedings of the Thirtieth international conference on Very large data bases, 2004, vol. 30, pp. 1134-1145.*

(Continued)

Primary Examiner—Shahid A Alam
Assistant Examiner—Phong Nguyen
(74) Attorney, Agent, or Firm—Hickman Palermo Truong & Becker LLP (57) ABSTRACT

A method for processing queries is provided. A first representation of a query is generated, where the query includes a certain operator that is to be performed based on an XPath expression that is expandable into multiple location paths. The first representation of the query is rewritten into a second representation that corresponds to an equivalent query, where rewriting the first representation includes expanding the XPath expression into the plurality of location paths and, based on the certain operator, including a plurality of operators in the second representation, where the plurality of operators include: a first set of operators that is to be performed based on each of the plurality of location paths, and a second set of operators that is to be performed based on data returned from at least one operator included in the first set of operators. The query may thereafter be executed based on the second representation. The second representation may be further rewritten to third representation depending on the physical storage of XML.

38 Claims, 3 Drawing Sheets

U.S. PATENT DOCUMENTS

| | | | |
|---|---|---|---|
| 7,120,645 B2 * | 10/2006 | Manikutty et al. | 707/102 |
| 7,194,462 B2 | 3/2007 | Riccardi et al. | |
| 7,266,764 B1 | 9/2007 | Flam | |
| 7,315,852 B2 * | 1/2008 | Balmin et al. | 707/3 |
| 7,386,568 B2 * | 6/2008 | Warner et al. | 707/102 |
| 2002/0073019 A1 | 6/2002 | Deaton | |
| 2002/0116457 A1 | 8/2002 | Eshleman et al. | |
| 2003/0097383 A1 | 5/2003 | Smirnov et al. | |
| 2003/0115548 A1 | 6/2003 | Melger | |
| 2003/0140308 A1 | 7/2003 | Murthy et al. | |
| 2004/0064466 A1 * | 4/2004 | Manikutty et al. | 707/100 |
| 2004/0148278 A1 | 7/2004 | Milo et al. | |
| 2004/0220912 A1 * | 11/2004 | Manikutty et al. | 707/3 |
| 2004/0267760 A1 | 12/2004 | Brundage et al. | |
| 2005/0065949 A1 * | 3/2005 | Warner et al. | 707/100 |
| 2005/0097084 A1 * | 5/2005 | Balmin et al. | 707/3 |
| 2005/0120001 A1 * | 6/2005 | Yagoub et al. | 707/3 |
| 2005/0228791 A1 * | 10/2005 | Thusoo et al. | 707/6 |
| 2005/0289125 A1 | 12/2005 | Liu et al. | |
| 2006/0031233 A1 * | 2/2006 | Liu et al. | 707/100 |
| 2006/0074901 A1 | 4/2006 | Pirahesh et al. | |
| 2006/0212491 A1 * | 9/2006 | Agrawal et al. | 707/202 |
| 2006/0224564 A1 * | 10/2006 | Yu et al. | 707/2 |
| 2006/0224627 A1 * | 10/2006 | Manikutty et al. | 707/104.1 |
| 2006/0235840 A1 | 10/2006 | Manikutty et al. | |

OTHER PUBLICATIONS

Microsoft Computer Dictionary, 2002, Microsoft Press, Fifth Edition, 3 pages.*

W3C, "XML Path Language (XPath) 2.0", W3C Candidate Recommendation Nov. 3, 2005, located at http://www.w3.org/TR/xpath20/, 128 pgs.

* cited by examiner

TECHNIQUES OF REWRITING DESCENDANT AND WILDCARD XPATH USING ONE OR MORE OF SQL OR, UNION ALL, AND XMLCONCAT() CONSTRUCT

CROSS-REFERENCE TO RELATED APPLICATIONS

This application is related to U.S. patent application Ser. No. 10/428,878, entitled "TECHNIQUES FOR REWRITING XML QUERIES DIRECTED TO RELATIONAL DATABASE CONSTRUCTS", filed by Anand Manikutty et al. on May 1, 2003, the entire contents of which is hereby incorporated by reference for all purposes as if fully set forth herein.

This application is related to U.S. patent application Ser. No. 10/984,471, entitled "TECHNIQUES FOR PARTIAL REWRITE OF XPATH QUERIES IN A RELATIONAL DATABASE", filed by James W. Warner et al. on Nov. 8, 2004, the entire contents of which is hereby incorporated by reference for all purposes as if fully set forth herein.

This application is related to U.S. patent application Ser. No. 11/237,286, entitled "OPTIMIZATION OF QUERIES OVER XML VIEWS THAT ARE BASED ON UNION ALL OPERATORS", filed Anand Manikutty et al. on Sep. 27, 2005, the entire contents of which is hereby incorporated by reference for all purposes as if fully set forth herein.

FIELD OF THE INVENTION

The present invention generally relates to eXtensible Markup Language (XML). The invention relates more specifically to a method of rewriting queries with operators over descendant and wildcard XPath expressions by using Structured Query Language (SQL) OR, UNION ALL, and XMLConcat( ) construct.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML is a standard for data and documents that is finding wide acceptance in the computer industry. XML describes and provides structure to a body of data, such as a file, a data stream, or a data packet. The specification for XML was developed by the W3C consortium and is located on the Internet at "http://www.w3.org/XML". According to the XML specification, XML data is organized in nodes that are logically arranged as hierarchical trees. The XML specification also provides for opening and closing tags that delimit different portions of an XML document, which portions are commonly referred to as XML elements. The data included between an opening and a closing tag of an XML element is referred to as the XML element's content. Each XML element may also contain one or more name-value pairs referred to as attributes.

Figure 1:
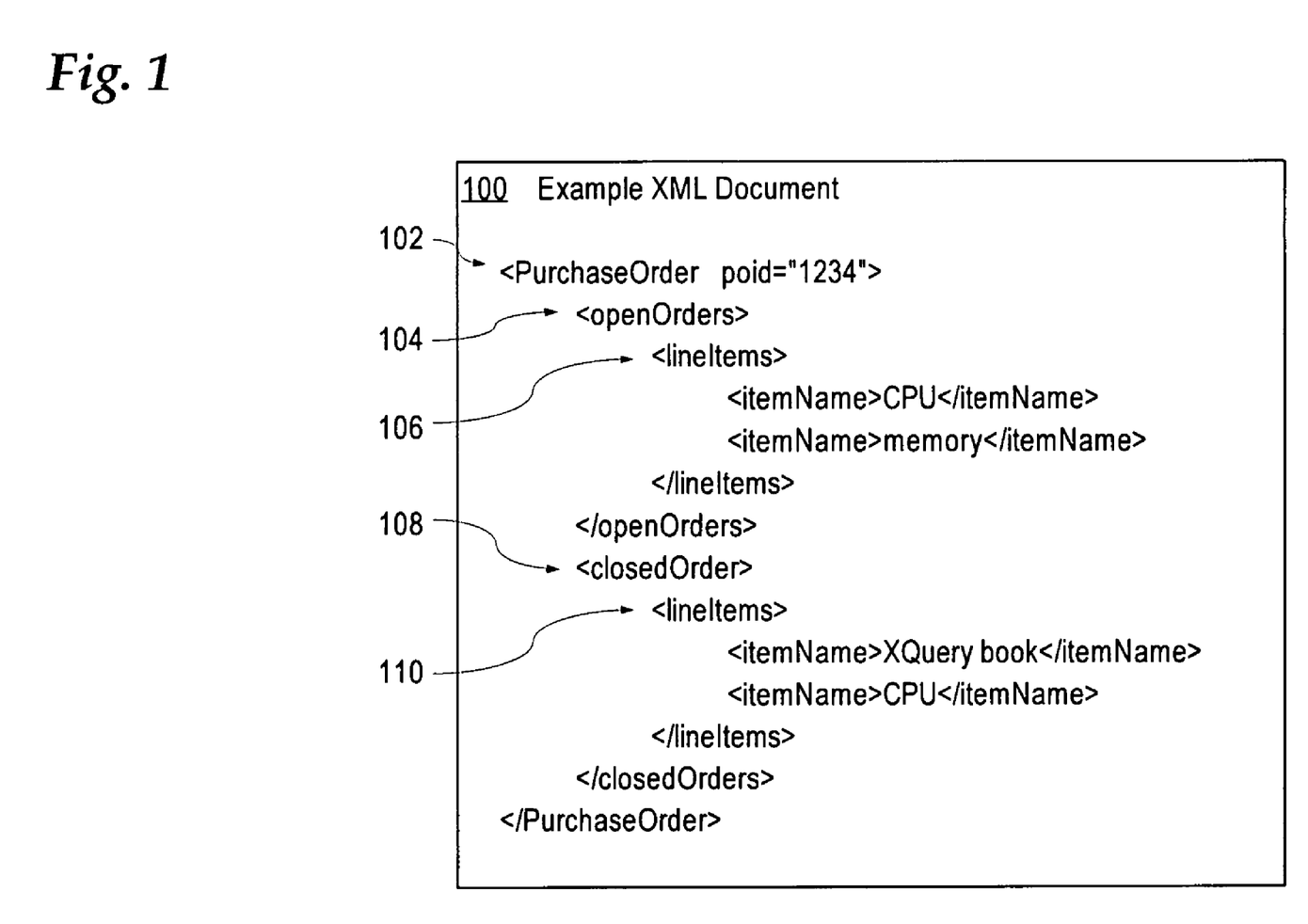
FIG. 1 is a block diagram that illustrates an example XML document.

For example, FIG. 1 is a block diagram that illustrates XML document 100, which stores the data of a purchase order. As indicated by opening tag 102, XML document 100 includes the XML element "PurchaseOrder" as the parent node of the document. The "PurchaseOrder" XML element includes the attribute "poid" that is associated with the value "1234". As indicated by opening tags 104 and 108, the "PurchaseOrder" XML element also includes XML elements "openOrders" and "closedOrders" as child nodes. Each of XML elements "openOrders" and "closedOrders" includes other XML elements as child nodes, such as, for example, XML elements "lineItems" and "itemName".

The content and structure of an XML document may be validated against an XML schema. As referred to herein, an XML schema is a set of schema components that describes the structure of XML documents and specifies constraints on the content of the documents. Typically, an XML schema conforms to a definition language; examples of such definition languages include, but are not limited to, any type of proprietary or open-source Document Type Definition (DTD) language and the XML Schema Language (as described in the XML Schema Specification, W3C Recommendation 28 Oct. 2004, located at "http://www.w3.org/TR/xmlschema-0/", "http://www.w3.org/TR/xmlschema-1/", and "http://www.w3.org/TR/xmlschema-2/", the entire contents of which are hereby incorporated by reference for all purposes as if fully set forth herein).

Various expression languages have also been developed for accessing and querying a broad spectrum of XML data that is stored in various XML repositories, such as, for example, relational databases, object-relational databases, and object databases. One such language is the XML Path Language (XPath). A specification for XPath is described in "XML Path Language (XPath) 2.0", W3C Candidate Recommendation 3 Nov. 2005, located at "http://www.w3.org/TR/xpath20/", the entire content of which is hereby incorporated by reference for all purposes as if fully set forth herein. The basic purpose of XPath is to provide mechanisms for addressing the nodes in XML documents. The basic building block of XPath is the XPath expression, which is a string of characters. XPath provides for different types of XPath expressions that may be constructed from sub-expressions, keywords, symbols, and operands. Evaluating an XPath expression may result in identifying a set of nodes from the input XML documents, one or more atomic values, or more generally, identifying XML data instances of any type allowed by the XQuery Data Model. (A draft specification for the XQuery Data Model is described in "XQuery 1.0 and XPath 2.0 Data Model", W3C Candidate Recommendation 3 Nov. 2005, located at "http://www.w3.org/TR/xpath-datamodel/", the entire content of which is hereby incorporated by reference for all purposes as if fully set forth herein.)

One commonly-used type of XPath expression is a location path. A location path, when evaluated, identifies a set of nodes relative to a context node and can be used to locate the nodes within XML document trees. A location path typically includes a series of one or more expressions, which may also be referred to as steps. One type of step, or expression, that may be included in a location path is the axis expression. An axis expression identifies a set of nodes that are reachable from the context node via a specified axis.

One type of axis expression is the descendant axis expression, which may be represented in a location path by the abbreviation "//". A descendant axis is defined as the transitive closure of the child axis. Thus, a descendant axis expression identifies all descendants of the context node (the children of the context node, the children of the children nodes, and so on), where the descendants do not include attribute nodes and namespace nodes.

Descendant axis expressions are commonly used in queries to query XML documents. For example, consider the following query Q0, which tries to find the purchase order id for all purchase orders stored in XML documents that include a "CPU" item:

```
Q0.    select extractValue(value(v),'/PurchaseOrder/@poid')
       from potab v
       where existsNode(value(v),'//lineItems[itemName="CPU"]')=1
```

The query Q0 includes the descendant axis expression "//lineItems" as an input argument to the "existsNode" operator. This descendant axis expression may be used in query Q0 for at least the following three reasons, which are also some of the main reasons of why usage of descendant axis expressions in queries is so common:

(1) the user may not be aware of the full XML schema that purchase order XML documents conform to; thus, the user may not be able to list the exact location paths to the "lineItems" XML elements from the root node of a purchase order XML document;
  (2) the XML schema, in which the purchase order XML documents are defined, may be allowed to evolve and as a result the location paths to the "lineItems" XML elements may change in the future; thus, using the descendant axis expression "//" in the input argument to the "existsNode" operator protects the user from having to change the query when the XML schema changes; and
  (3) there may be multiple paths leading to "lineItems" XML elements from the root; thus, listing all location paths in the query may be too cumbersome for the user.

Despite the common usage of descendant axis XPath expressions, however, the past approaches for evaluating queries, such as query Q0, that include dependant axis expressions are not efficient and suffer from multiple disadvantages. Specifically, the past approaches are not suited to efficiently handle queries that are based on descendant axis expressions that identify, and are expandable into, multiple location paths.

As an example, consider evaluating query Q0 against the example XML document 100 that is illustrated in FIG. 1. As indicated by opening tags 106 and 110, XML document 110 includes "lineItems" XML elements within both the "openOrders" XML element and the "closedOrders" XML element. Thus, the descendant axis expression "//lineItems" in query Q0 would identify both the "/PurchaseOrder/openOrders/lineItems" location path and the "/PurchaseOrder/closedOrders/lineItems" location path. (It is noted that the XML document in FIG. 1 is provided for illustration purposes only. In a real life scenario, an XML document storing a purchase order may be significantly more complex in structure, may include a significant number of purchase order XML elements, and may include multiple types of XML elements that include "lineItems" XML elements, all of which would make evaluating query Q0 against such an XML document significantly more complex and computationally expensive than XML document 100 in FIG. 1 might otherwise suggest.)

According to one past approach, queries that include operators over descendant axis expressions are not optimized at all. According to this approach, whenever a query engine detects the presence of a descendant axis expression in a query, the query engine first fully materializes the underlying XML documents and only thereafter evaluates the operators that are based on location paths identified by the descendant axis expression. In this way, the query engine ensures that it can properly process the query when the descendant axis expression identifies multiple location paths since the query engine has materialized and can access the entire underlying XML documents. The disadvantage of this approach, however, is that the process of materializing XML documents is computationally expensive with respect to resources, such as, for example, memory, CPU time, and storage space. For this reason, this approach typically suffers from severe performance degradation and user-perceived latency especially in cases where queries are evaluated against large XML documents that are stored in object-relational storage.

According to another past approach, a query engine is generally capable of optimizing query operators over deterministic XPath location paths prior to query execution, but is not capable of processing descendant axis expressions because descendant axis expressions may identify multiple location paths. Thus, in this approach users are required to expressly list all XPath location paths before submitting the query to the query engine. One disadvantage of this approach is that it is not user-friendly and places the burden on the users to know the exact structure of the XML documents being queried, which may not be feasible. Another disadvantage is that the users are not protected from XML schema evolution since queries identifying exact location paths may have to be changed when the XML schema of the queried XML documents is changed.

Although the disadvantages of the above approaches are presented with respect to descendant axis expressions that identify multiple location paths, it is noted that these disadvantages are not unique to the descendant axis expressions. Rather, these disadvantages are common to any kind XPath expression that is capable of identifying multiple location paths. An example of such other XPath expression is the wildcard expression, which may be represented in a principal XPath expression by the symbol "*". A wildcard expression, when evaluated, identifies all location paths to nodes that are of the same node type as the context node in the principal XPath expression. For example, when used in an XPath expression relative to an element context node, a wild card expression may identify all XML elements that are children nodes of the context node.

Based on the foregoing, techniques are clearly needed for efficiently processing of queries that include operators over XPath expressions that identify multiple location paths.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Functional Overview

Figure 2:
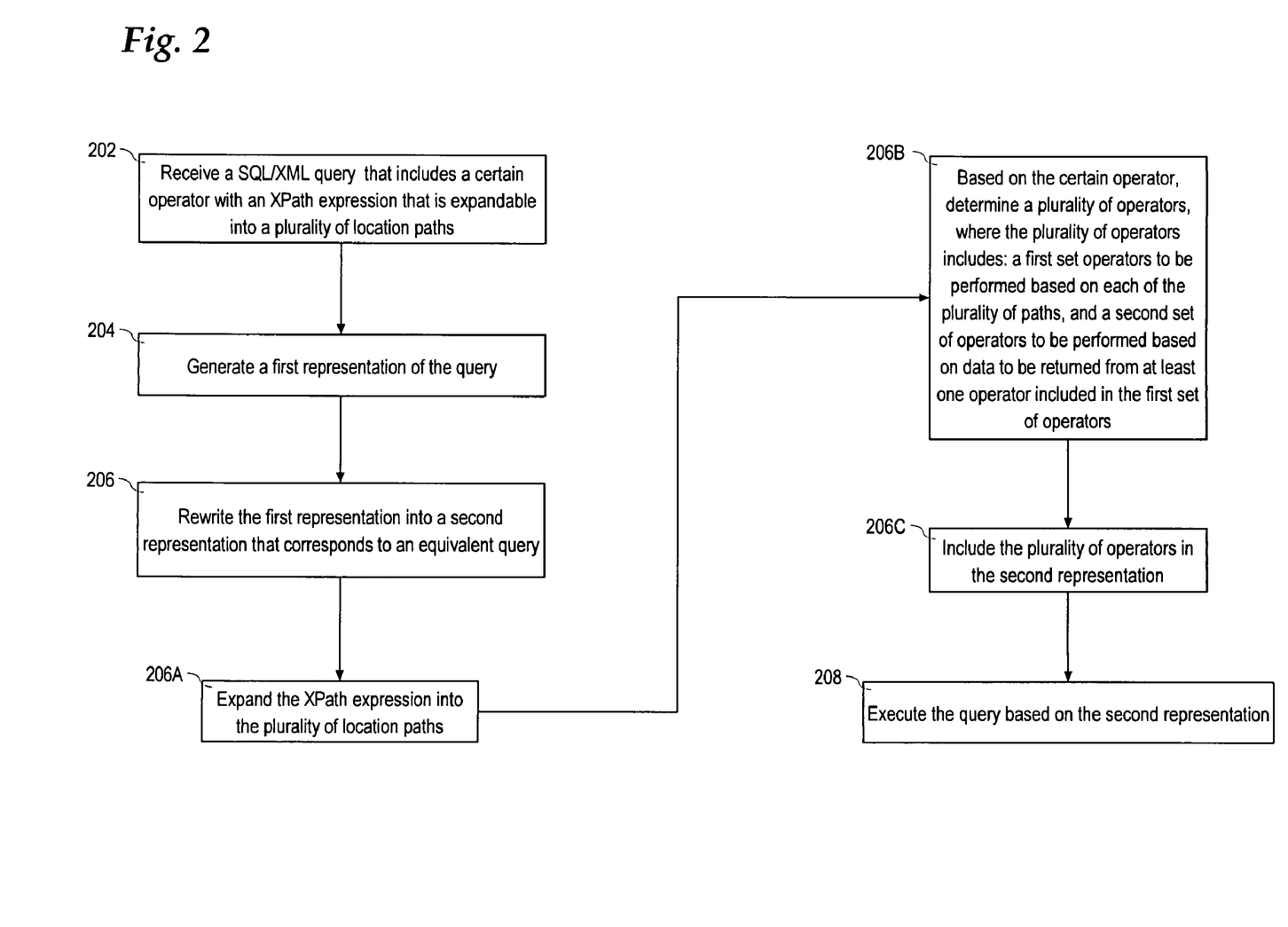
FIG. 2 is a flow diagram that illustrates an overview of a method for processing queries according to one embodiment of the techniques described herein.

FIG. 2 is a flow diagram that illustrates an overview of a method for processing queries according to one embodiment of the techniques described herein.

In step 202, a SQL/XML query is received. The query includes a certain operator with an input argument that is an XPath expression which indicates, and is expandable into, a plurality of location paths.

As referred to herein, a SQL/XML query is a query that includes one or more operators defined according to a SQL/XML standard, such as, for example, the SQL/XML standard defined in INCITS/ISO/IEC 9075-14:2003, the entire content of which is hereby incorporated by reference for all purposes as if fully set forth herein. As referred to herein, an operator is a set of instructions which, when executed, performs one or more specific operations. An operator may take zero or more input arguments and may be implemented in various ways, such as, for example, as a function, as a subroutine, or as a construct.

In step 204, a first representation of the received query is generated. In some embodiments, the first representation of the query may be an expression tree representing a parsed version of the query and may be generated by a parser. In these embodiments, the expression tree may include operator trees that represent each operator indicated in the query. For example, the expression tree may be an Abstract Syntax Tree (AST) that represents the various operators and operands in the query. (In general, an AST is a representation of a set of executable statements. An AST representation is typically a tree structure in which internal tree nodes are associated with the operations specified in the set of statements being represented by the AST, and the leaf tree nodes are associated with the operands for the operations specified in the internal tree nodes to which the leaf tree nodes are related.)

In other embodiments, the first representation may be a tree representing a type-checked and/or compiled version of the received query and may be generated by a compiler. In yet other embodiments, the first representation of the received query may be any data structure, such as, for example, a table, on the bases of which the query may subsequently be executed. In addition, in various embodiments the first representation may be generated in volatile memory (e.g. RAM) and/or in persistent storage (e.g. hard disk) of a computer system. Thus, the techniques described herein are not restricted to any particular type of representation that is generated for the received query.

Prior to executing the received query, in step 206 the first representation of the received query is rewritten into a second representation. The second representation corresponds to an equivalent query of the received query. (As referred to herein, a first query is equivalent to a second query if the first query, when executed, would return the same results as the second query.) In some embodiments, according to the techniques described herein the first representation is rewritten into a second representation after the received query is parsed but before the received query is compiled. In other embodiments, the first representation of the received query is rewritten into the second representation during the compilation of the first query but before the query is executed. In yet other embodiments in which parsing, type-checking, compiling, and executing the query is performed dynamically in a set of integrated steps by an integrated software component, the first representation may be rewritten into the second representation at any point before the received query is executed.

According to the techniques described herein, the step 206 of rewriting the first representation into the second representation comprises at least steps 206A, 206B, and 206C.

In step 206A, the XPath expression (which is specified as an input argument in the certain operator of the received query) is expanded into the plurality of location paths indicated by the expression. For example, the XPath expression may include a descendant axis expression that indicates the plurality of location paths. In another example, the XPath expression may include a wildcard expression that indicates the plurality of location paths.

In some embodiments, the plurality of location paths included in the XPath expression may be determined based on an XML schema that defines the structure of the XML documents against which the received query is to be executed. For example, the XPath expression included in the received query may be functionally evaluated against the XML schema in order to determine all location paths indicated by the expression. The techniques described herein, however, are not limited to any particular mechanism for expanding the XPath expression specified in the received query into multiple location paths; thus, any now known or later developed mechanism may be used to expand the XPath expression into its corresponding plurality of location paths.

In step 206B, a plurality of operators is determined based on the certain operator of the received query that includes the XPath expression. The plurality of operators includes a first set of operators that are to be performed based on each of the plurality of location paths, and a second set of operators that are to be performed based on data that is to be returned from at least one operator included in the first set of operators.

For example, the certain operator included in the query may be an existsNode( ) operator that is defined in a SQL/XML standard. (The existsNode( ) operator, when evaluated based on an input argument that is an XPath expression, returns a Boolean TRUE value if an XML element exists in the queried XML documents at the location indicated by the XPath expression; otherwise, the existsNode( ) operator returns a Boolean FALSE value.) According to the techniques described herein, if the certain operator is an existsNode( ) operator, then the plurality of operators into which the existsNode( ) operator is rewritten is as follows: the first set of operators includes an existsNode( ) operator over each of the plurality of location paths indicated by the input argument XPath expression; and the second set of operators includes at least one SQL OR operator that is to be performed over the values returned by the existsNode( ) operators in the first set of operators.

In another example, the certain operator included in the query may be an extract( ) operator that is defined in a SQL/XML standard. (The extract( ) operator, when evaluated based on an input argument that is an XPath expression, returns the fragment of XML nodes that is stored in the queried XML documents at the location indicated by the XPath expression. As referred to herein, an XML fragment is a set of nodes in an XML document that descend from a parent node, which set of nodes represent XML elements or sequences of XML elements in the document.) According to the techniques described herein, if the certain operator is an extract( ) operator, then the plurality of operators into which the extract( ) operator is rewritten is as follows: the first set of operators includes an extract( ) operator over each of the plurality of location paths indicated by the input argument XPath expression; and the second set of operators includes at least one XMLConcat( ) operator that is to be performed over the XML fragments or elements returned by the extract( ) operators in the first set of operators. (The XMLConcat( ) operator, when evaluated, returns the concatenation of the XML fragments that are passed in as input arguments.)

In general, according to the techniques described herein, the first set of operators into which the certain operator is rewritten includes operators that are performed based on each of the location paths indicated by the XPath expression specified as an input argument of the certain operator. If the certain operator in the received query returns a scalar value, then the second set of operators includes a combination of one or more operators that evaluate to a scalar value, such as, for example, SQL OR and/or SQL AND operators. If the certain operator in the received query returns an instance of data that is not a scalar value, then the second set of operators generally includes a combination of one or more aggregation-type of operators, such as, for example, SQL UNION ALL, SQL/XML XMLAgg( ), and/or SQL/XML XMLConcat( ) operators.

The plurality of operators, into which the certain operator specified in the received query is rewritten, is included in the second representation in step 206C. In some embodiments, the second representation may be generated by directly modifying the first representation of the query. For example, if the first representation is an expression tree of the received query, then the second representation may be generated by replacing the operator tree representing the certain operator with the operator trees that represent the plurality of operators. In other embodiments, the second representation may be a representation that is generated as a separate copy based on the first representation.

After the first representation of the received query is rewritten according to the techniques described herein into the second representation, in step 208 the query is executed based on the second representation.

In different embodiments, the query may be executed based on the second representation in a variety of ways. For example, an execution tree or an execution plan of the received query may be generated based on the second representation. The execution tree or the execution plan of the received query may then be stored for future use or may be executed immediately by the computer system that is processing the query. In another example, the techniques described herein may be performed by an application server or a client that is not capable of executing the received query against a repository of XML data. In this example, the application server or client may use the second representation to generate an optimized equivalent query of the received query. Thereafter, the application server or client may send the generated equivalent query to a database server for execution. Thus, the techniques described herein are not limited to any particular manner in which the received query may be executed based on the generated second representation.

Operational Contexts

The techniques for rewriting queries described herein may be performed by a variety of computer systems or components thereof in a variety of operational contexts.

For example, in one embodiment the techniques described herein may be performed by a database server and/or one or more components thereof. In general, a server is a combination of integrated software components and an allocation of computational resources, such as memory, CPU time, and/or disk storage space. By utilizing its allocated resources, a database server performs data management functions, such as, for example, governing and facilitating access to particular databases, and processing requests by clients to access the databases.

In this embodiment, the database server may be communicatively connected to one or more clients or application servers and may be configured to process queries for SQL data and/or XML data that is stored in one or more relational, object-relational, and/or object databases.

In this embodiment, a database server or one or more components thereof may perform the techniques described herein at compile time during the process of compiling a received query. For example, a query processor executing within the database server may receive and parse a query. During the process of compiling a parsed tree that represents the received query, the query processor may rewrite a first expression tree of the query into a second expression tree, in which a certain operator or operators specified in the query are rewritten into a plurality of operators according to the techniques described herein. Thereafter, the query processor may generate an execution tree or an execution plan of the query based on the second expression tree. The execution tree of the query may then be stored by the database server for future use or may be executed immediately.

In another embodiment, the techniques described herein may be performed by an application server that is configured for supporting one or more applications that perform a particular application-specific function. In this embodiment, the application server may be communicatively connected to a database server that manages SQL data and/or XML data in one or more databases. The application server may be configured to receive queries from one or more clients and to send the queries or equivalents thereof to the database server for execution.

In this embodiment, the application server or one or more components thereof may perform the techniques described herein in response to receiving a query from a client. For example, a query processor executing within the application server may receive and parse a query. Thereafter, the query processor may rewrite a parsed tree representing the query into an expression tree, in which a certain operator or operators specified in the query are rewritten into a plurality of operators according to the techniques described herein. Based on the expression tree, the query processor may then generate the text of a query that is equivalent to the received query. Thereafter, the query processor and/or the application server may send the equivalent query to the database server for execution.

In another embodiment, the techniques described herein may be performed by an entity, such as, for example, a database client, that is communicatively connected to a database server that manages SQL data and/or XML data in one or more databases. For example, a query processor at a database client may receive a query from a user or a user application, and may process the query similarly to the query processor of the application server described above. Thus, the techniques for rewriting queries described herein are not limited to being performed in a particular operational context and/or by a particular type of entity, and for this reason the embodiments described herein are to be regarded in an illustrative rather than a restrictive sense.

Logical and Physical Query Rewrites

According to the techniques described herein a query, which includes one or more operators that include XPath expressions indicating multiple location paths, may be rewritten by generating and/or modifying one or more representations of the query.

In one embodiment, the representations may be ASTs that include operator trees which represent the operators and/or the operations specified in the query. In this embodiment, after a query is received it is run through a parser. The parser generates an AST that represents the query, where the AST includes as expression sub-trees operator trees that represent the operators specified in the query. Thereafter, during compile time portions of the generated query AST (or a copy thereof) are rewritten. For example, the operator trees of certain operators in the generated query AST may be modified to reflect one or more operator trees for other operators. In another example, operator trees of operators that are not specified by the query may be added to the generated query AST and/or operator trees of certain operators specified in the query may be removed from the generated query AST. In addition, the process of adding, deleting, replacing, and/or modifying operator trees in the query AST may be performed in several passes, and the query AST or ASTs generated by the process may be traversed in any order. After the modified query AST is generated, it is type-checked and annotated with any information that may be necessary to generate an execution tree or plan of the query. Thereafter, the modified query AST may be further traversed and any non-SQL portions of the AST may be translated into operator trees of operators that are understood by a SQL query engine. In this way, the received query may be compiled and prepared for execution against one or more tables in one or more relational databases.

Thus, in this embodiment the process of rewriting an AST representing a query automatically generates a second AST that is simplified and optimized for efficiently performing the operations specified in the original query. The second AST typically corresponds to a query that is equivalent to the original query. Further, in some embodiments the process of rewriting the query may generate in sequence one or more ASTs corresponding to equivalent queries by performing logical query rewrites, physical query rewrites, and any combination of logical and physical query rewrites.

A logical rewrite refers to any modification performed on a query, or a representation thereof, that is independent of the type of physical storage in which the queried XML data is stored. A physical rewrite refers to any modification performed on a query, or a representation thereof, that references and is dependant on the physical storage in which the queried XML data is stored. For example, a physical query rewrite may be used to convert a first operator, which does not depend on the details of the physical storage of the queried XML data, into a second operator that references actual storage structure details, such as, for example, columns, tables, and specific rows therein.

According to the techniques described herein, a logical rewrite is performed on a first representation of a query that includes a query operator including an XPath expression that indicates multiple location paths. The query operator is mapped into a plurality of operators, where the plurality of operators include a first set of operators that are to be performed based on each of the multiple location paths, and a second set of operators that are to be performed based on data that is to be returned by the operators in the first set. The plurality of operators is then included in a second representation that corresponds to an equivalent query. A physical rewrite may be then performed on the second representation in order to further optimize the resulting query by translating the operators included in the second representation into operators that reference the storage structures into which the queried XML data is stored.

In some XML-enabled Relational Database Management Systems (RDBMS) and Object-Relational Database Management Systems (ORDBMS), XML data may be physically stored as LOB storage or object-relational storage. In addition, some database systems provide a native built-in datatype (referred to herein as XMLType) which allows users to store XML data natively via the use of XMLType tables or XMLType columns. In these database systems, XMLType may be implemented as a logical datatype that conforms the SQL/XML standard. Further, some database systems may extend XMLType by providing support for representing instances of data defined in the XQuery Data Model.

In XML-enabled database systems, XML data of the XMLType may be physically stored as LOB storage or object-relational storage. When LOB storage is used to physically store XML data, an instance of XML data is stored in a record of a relational table where the instance is stored in a column of the table that is associated with an XMLType datatype. For example, an instance of XML data that is an XML document may be stored in a LOB column of a table record. The data stored in the LOB column may be of any LOB type, such as, for example, a Character LOB (CLOB) or a Binary LOB (BLOB). The LOB column of the table record may store the entire XML document, and the table may include multiple records for storing a collection of XML documents where each record stores a separate XML document in its LOB column. In cases in which the stored instances of XML data are large XML documents, instead of storing an entire XML document in a LOB column, the table record may store in the column a reference (e.g. a LOB locator) to an aggregate storage location that contains the particular XML document.

When object-relational storage is used to physically store XML data, an instance of XML data is shredded into its XML elements and attributes. The XML elements' contents and the attribute values are stored in columns of one or more relational tables, where the columns are associated with relational database datatypes. The one or more relational tables may be related by a set of primary and foreign keys, where the values of the primary and foreign keys may be stored in primary and foreign key columns in the tables.

Rewriting Queries Including Exists-Node Operators

The techniques described herein provide for performing logical rewrites of a SQL/XML query that includes a certain exists-node operator by using a combination of multiple exists-node operators and at least one OR operator. In general, an exists-node operator determines the existence of a node or nodes that are identified by an XPath expression that is passed as input argument to the operator. An example of an exists-node operator is the existsNode( ) operator defined in the SQL/XML standard. (In general, an OR operator performs a logical OR-operation over a set of values and returns a Boolean TRUE value if any of the values in the set is Boolean TRUE value; otherwise the OR operator returns a Boolean FALSE value.)

As an example, consider query Q0:

| Q0. | select extractValue(value(v),'/PurchaseOrder/@poid') from potab v where existsNode(value(v),'//lineItems[itemName="CPU"]')=1 |
|---|---| which, as mentioned above, tries to find the purchase order id for all purchase orders stored in XML documents that include a "CPU" item. Suppose that query Q0 is to be executed against target XML documents that have a structure similar to the structure of XML document 100 illustrated in FIG. 1, where the target XML documents may be stored in table "potab" as any one of a LOB storage and an object-relational storage.

According to the techniques described herein, a logical rewrite of query Q0 generates a representation of the equivalent query Q1, which is provided below:

```
Q1.   select extractValue(value(v),'/PurchaseOrder/@poid')
      from potab v
      where existsNode(value(v),
              '/PurchaseOrder/openOrders/lineItems[itemName=
              "CPU"]')=1
          OR
          existsNode(value(v),
              '/PurchaseOrder/closedOrders/lineItems[itemName=
              "CPU"]')=1
```

The descendant axis expression "//lineItems", which is passed as input argument of the existsNode( ) operator in query Q0, is expanded in query Q1 into all of the location paths that can be identified based on the structure of the target XML documents (e.g. location paths "/PurchaseOrder/openOrders/lineItems" and "/PurchaseOrder/closedOrders/lineItems"). Further, in query Q1 the original existsNode( ) operator is rewritten into separate existsNode( ) operators each of which tests one of the multiple location paths identified by the original "//lineItems" descendant axis expression. Finally, in query Q1 a SQL OR operator is provided to evaluate the results that are to be returned by the multiple existsNode( ) operators. (As used herein, "value(v)" is an alias to a column of XMLType that is the single column in a relational table.)

According to the techniques described herein, a physical rewrite may be further performed on query Q1 to take into account the underlying storage structures into which the target XML documents are stored.

For example, suppose that the target XML documents are stored as object-relational storage in one or more relational tables. Specifically, suppose that the "openOrders" XML elements are stored in the "openOrder_lineItem" table with foreign key column "id", which joins to the primary key column "setid" in the "potab" table. Similarly, suppose that the "closedOrders" XML elements are stored in the "closedOrder_lineItem" table with foreign key column "id", which joins to the primary key column "setid" in the "potab" table. Finally, suppose that the attribute "poid" of a purchase order is stored in column "poid" of the "potab" table. Then, a physical rewrite of query Q1 would generate a representation of the equivalent query Q2, which is provided below:

```
Q2.   select V.poid
      from potab V
      where exists(select 1 from openOrder_lineItem L1
                  where itemName="CPU" and L1.id = V.setid)
          OR
          exists(select 1 from closedOrder_lineItem L2
                  where itemName="CPU" and L2.id = V.setid)
```

Since the target XML documents are stored as object-relational storage in at least three relational tables, the existsNode( ) operators from query Q1 are translated in query Q2 into exists( ) SQL operators that take as input arguments subqueries that are to be executed against the identified relational tables.

Rewriting Queries Including Extract Operators

The techniques described herein provide for performing logical rewrites of a SQL/XML query that includes a certain extract operator by using a combination of multiple extract operators and at least one XMLConcat( ) operator. In general, an extract operator returns one or more XML fragments that are identified by an XPath expression that is passed as an input argument to the operator. An example of an extract operator is the extract( ) operator defined in the SQL/XML standard.

As an example, consider query Q3:

```
Q3.   select extract(value(v),'//lineItems')
      from potab v
``` which tries to return all "lineItems" XML elements that are stored in the target XML documents. Suppose that query Q3 is to be executed against target XML documents that have a structure similar to the structure of XML document 100 illustrated in FIG. 1, where the target XML documents may be stored in table "potab" as any one of a LOB storage and an object-relational storage.

According to the techniques described herein, a logical rewrite of query Q3 generates a representation of the equivalent query Q4, which is provided below:

```
Q4.   select XMLConcat(
              (select extract(value(v),
                      '/PurchaseOrder/openOrders/lineItems')
              from dual),
              (select extract(value(v),
                      '/PurchaseOrder/closedOrders/lineItems')
              from dual) )
      from potab v
```

The descendant axis expression "//lineItems", which is passed as input argument of the extract( ) operator in query Q3, is expanded in query Q4 into all of the location paths that can be identified based on the structure of the target XML documents (e.g. location paths "/PurchaseOrder/openOrders/lineItems" and "/PurchaseOrder/closedOrders/lineItems"). Further, in query Q4 the original extract( ) operator is rewritten into separate subqueries that include extract( ) operators, each of which is to be evaluated based on one of the multiple location paths identified by the original "//lineItems" descendant axis expression. (The table "dual" which is referenced in these subqueries is provided for syntactical conformity and is used to represent a scalar value as a relational table having exactly one row and one column.) Finally, in query Q4 an XMLConcat( ) operator is provided to concatenate the XML fragments that are to be returned by the subqueries that include multiple extract( ) operators.

According to the techniques described herein, a physical rewrite may be further performed on query Q4 to take into account the underlying storage structures into which the target XML documents are stored.

For example, suppose that the target XML documents are stored as object-relational storage in one or more relational tables in the same manner as described above with respect to query Q2. Then, a physical rewrite of query Q4 would generate a representation of the equivalent query Q5, which is provided below:

```
Q5.   select XMLConcat(
              (select XMLAgg(mkxml(...)) from openOrder_lineItem L1
                    where L1.id = V.setid)
              (select XMLAgg(mkxml(...)) from closedOrder_lineItem L2
                    where L2.id = V.setid) )
      from potab V
```

In query Q5, the extract( ) operators from query Q4 are translated into a combination of XMLAgg( ) and mkxml( ) operators in order to facilitate the execution of query Q5 against relational tables. In general, when evaluated, the mkxml( ) operator returns an instance of the XMLType from a value that is stored in a column of a relational table, and the XMLAgg( ) operator returns a concatenation of instances of the XMLType that are passed as input arguments, where each of the input arguments conceptually comes from (possibly) the same column of a different row of a particular relational table.

Rewriting Queries Including XMLTable( ) Construsts

The techniques described herein provide for performing logical rewrites of a SQL/XML query that includes an XML-Table( ) construct by using a combination of multiple extract operators and at least one XMLConcat( ) operator. The XML-Table( ) construct is defined in the SQL/XML standard and is used to store an instance of XML data (e.g. an XML document or a set of XML fragments) that has a hierarchical structure as object-relational storage in a relational table. The XMLTable( ) construct takes an instance of XML data as input argument and, when evaluated, returns a relational structure such as a relational table or a materialized view.

As an example, consider query Q6:

```
Q6.   select V.itemName
      from potab, XMLTable('//lineItems' passing value(potab)
          columns itemName varchar(20) path 'itemName') V
``` which tries to retrieve from object-relational storage the content of all "itemName" XML elements that are sub-elements of the "lineItems" XML elements. Suppose that the "lineItems" XML elements are stored in target XML elements, which have a structure similar to the structure of XML document 100 illustrated in FIG. 1 and may be stored in table "potab" as any one of a LOB storage and an object-relational storage.

According to the techniques described herein, query Q6 may be rewritten in several steps by performing a combination of multiple logical and physical rewrites. Specifically, a logical rewrite of query Q6 generates a representation of the equivalent query Q7, which is provided below:

```
Q7.   select V2.itemName
      from potab V, lateral(select extractValue(V2, '/lineItems/
          itemName')
```

-continued

```
      from table (XMLSequence(XMLConcat(
          (select extract(value(v),
              '/PurchaseOrder/openOrders/lineItems')
                  from dual),
          (select extract(value(v),
              '/PurchaseOrder/closedOrders/lineItems')
                  from dual) ))) V2
      )
```

The descendant axis expression "//lineItems", which is passed as an input argument of the XMLtable( ) construct in query Q6, is expanded in query Q7 into all of the location paths that can be identified based on the structure of the target XML documents (e.g. location paths "/PurchaseOrder/openOrders/lineItems" and "/PurchaseOrder/closedOrders/lineItems"). Further, in query Q7 the original XMLtable( ) construct is rewritten into a subquery over a table( ) operator that creates a relational table based on input arguments that are separate subqueries. (The XMLSequence( ) operator which is referenced in the table( ) operator is used to convert into an array the instances of XMLType that are passed in as input arguments.) The separate subqueries include extract( ) operators, each of which is to be evaluated based on one of the multiple location paths identified by the original "//lineItems" descendant axis expression. Finally, in query Q7 an XML-Concat( ) operator is provided in the XMLSequence( ) operator to concatenate the XML fragments that are to be returned by the subqueries that include the multiple extract( ) operators.

A physical rewrite may be further performed on query Q7 in order to account for the underlying storage structures into which the target XML documents are stored. For example, suppose that the target XML documents are stored as object-relational storage in one or more relational tables in the same manner as described above with respect to query Q2. Then, a physical rewrite of query Q7 would generate a representation of the equivalent query Q8, which is provided below:

```
Q8.   select V2.itemName
      from potab V, lateral(select extractValue(V2, '/lineItems/
          itemName')
          from table(XMLSequence(XMLConcat(
              (select XMLAgg(mkxml(...))
                  from openOrder_lineItem L1
                  where L1.id = V.setid),
              (select XMLAgg(mkxml(...))
                  from closedOrder_lineItem L2
                  where L2.id = V.setid) ))) V2
      )
```

In query Q8, the extract( ) operators from query Q7 are translated into a combination of XMLAgg( ) and mkxml( ) operators in order to facilitate a more efficient way of accessing the identified relational tables.

In order to achieve further optimization, a logical rewrite may be performed on query Q8 in order to account for the fact that an XMLConcat( ) operator that is to be evaluated over a set of queries may be logically represented by an UNION ALL operator that is evaluated over the result sets returned by a set of equivalent queries. (In general, an UNION ALL operator, when evaluated over multiple sets of data, returns the aggregation of the multiple sets of data; for example, the multiple sets of data may be the result rowsets returned by multiple subqueries over relational tables.)

Specifically, the techniques described herein provide an optimization XMLConcat-to-UNION rule, according to which a query of the form:

```
select *
    from table(XMLSequence(XMLConcat(
        (select XMLAgg(sx1) from t1),
        (select XMLAgg(sx2) from t2),
        (select XMLAgg(sx3) from t3), ... )))
``` is equivalent to a query of the form (provided that sx1, sx2, sx3, etc. are single instances of XMLType):

```
select *
    from ( select sx1 from t1
        UNION ALL
        select sx2 from t2
        UNION ALL
        select sx3 from t3
        UNION ALL ... )
```

The above optimization rule indicates that a first table generated from a sequence of concatenated instances of XMLType generated from a set of scalar subqueries with XMLAgg( ) operators (by applying XMLSequence( ) operator over XML-Concat( ) operator with input arguments that are the set of scalar subqueries) is equivalent to a second table that may be generated by applying one or more UNION ALL operators over the set of scalar subqueries, provided that each XMLAgg( ) operator in the subqueries is evaluated over a single instance of XMLType. This rule reflects the observation that the outer XMLSequence( ) operator and the XML-Concat( ) operator included therein cancel out the inner XMLAgg( ) operator when the XMLAgg( ) operator returns a single instance of XMLType.

Based on the above XMLConcat-to-UNION rule, a logical rewrite performed on query Q8 may replace the XMLConcat( ) operator over the set of subqueries with a UNION ALL operator over a set of equivalent subqueries in order to better account for the underlying storage structures into which the target XML documents are stored. Such a logical rewrite of query Q8 would generate a representation of the equivalent query Q9, which is provided below:

```
Q9.   select V2.itemName
        from potab V, lateral(select extractValue(V2, '/lineItems/
            itemName')
            from ( select mkxml(...)
                from openOrder_lineItem L1
                where L1.id = V.setid
            UNION ALL
                select mkxml(...)
                from closedOrder_lineItem L2
                where L2.id = V.setid) V2
        )
```

In order to achieve further optimization, another physical rewrite may be performed on query Q9 in order to push down the extractValue( ) operator over the subqueries that form the input arguments (i.e. the branches) of the UNION ALL operator. (An extractValue( ) operator, when evaluated over a simple XML element, returns the content of the XML element as a scalar value of SQL datatype.) Such physical rewrite of query Q9 would generate a representation of the equivalent query Q10, which is provided below:

```
Q10.   select V2.itemName
        from potab V, lateral(select V2.itemName
            from ( select itemName
                from openOrder_lineItem L1
                where L1.id = V.setid
            UNION ALL
                select itemName
                from closedOrder_lineItem L2
                where L2.id = V.setid) V2
        )
```

Query Q10 may be further optimized by performing another physical rewrite in order to view-merge query Q10 into a simpler relational query. Such physical rewrite of query Q10 would generate a representation of the equivalent query Q11, which is provided below:

```
Q11.   select V.itemName
        from potab V, lateral ( select itemName
            from openOrder_lineItem L1
            where L1.id = V.setid
            UNION ALL
            select itemName
            from closedOrder_lineItem L2
            where L2.id = V.setid )
```

In query Q7 to Q11, the lateral( ) operator is a function which defines a join dependency between the arguments in its input argument list and indicates that the arguments must be evaluated in the order specified by the list.

Rewriting Operators Over Any Descendant Axis Expressions

In the examples provided above, query operators are evaluated over descendant axis expressions that indicate location paths that descend from a context node that is a root node of the target XML documents. The techniques described herein, however, are not so restricted.

For example, the techniques described herein may be applied to any query operator that includes a descendant axis expression anywhere in its input argument. For example, the techniques described herein may be applied to the descendant axis expression "/x/y//z", which indicates that there may be multiple location paths descending from XML element "y" that lead to XML element "z". Thus, the techniques described herein are applicable with respect to any XPath expression that includes a descendant axis expression so long as the XPath expression can be deterministically expanded into the multiple location paths indicated by the descendant axis expression and regardless of whether the descendant axis expression indicates location paths descending from a root node or an element node of the target XML document.

Rewriting Operators Over Descendant Axis Expressions That Indicate Recursive Location Paths The techniques described herein provide for performing logical rewrites of a SQL/XML query that includes a certain operator with an input argument that is an XPath expression indicating recursive location paths. (A recursive location path is a location path which is defined in the associated XML schema by using a reference to itself.)

For example, consider the descendant axis expression "//x". Suppose that from the associated XML schema it can be determined that this XPath expression identifies the following three location paths: "/a/b/x", "c/d/x", and "/e//x". While the first two location paths ("/a/b/x" and "c/d/x") are explicit and deterministic with the respect to the XML schema, the third location path, the location path "//e/x" is recursive since the XML element "x" is recursive under XML element "e".

Depending on the complexity of the XML schema, in some situations the explicit expanding of XPath expression identifying recursive location paths may not be feasible. For this reason, the techniques described herein provide for separate rewrite mechanisms for evaluating the set of deterministic location paths (which can be expressly determined from the associated XML schema) and the set of recursive location paths (which are identified as recursive based on the XML schema). At least one UNION ALL operator is also provided as part of the rewrite in order to aggregate the results of the evaluations over each of the deterministic and recursive sets of location paths.

For the set of deterministic location paths, the query operator is rewritten according to the techniques described above by first providing a first set of operators each of which is to be evaluated over one of the deterministic location paths, and then providing a second set of operators which are to be evaluated over data returned by the first set of operators.

A variety of rewrite techniques may be used to rewrite the query operator over the set of recursive location paths. For example, the query operator may be rewritten into a set of operators which, when evaluated, may perform dynamic data materialization based on the nodes identified by the recursive location paths. In another example, in which the XML elements addressed by the recursive location paths are stored in the same object-relational tables, the query operator over the recursive location paths may be rewritten into a set of operators, or subqueries over the relational tables, that performs joins based on the identifiers of the XML elements and the XML documents to which the XML elements belong.

As part of the final rewrite of the query, the techniques described herein provide one or more UNION ALL operators to aggregate the results that are to be returned from the rewritten operators over the set of deterministic location paths and the rewritten operators over the set of recursive location paths.

Rewriting Operators Over Wildcard XPath Expressions

The techniques described herein may also be applied with respect to a query that includes a certain operator which is to be evaluated over an XPath expression that includes a wildcard expression.

For example, a certain query operator may include the XPath expression "/a/*/b". Suppose that from the XML schema that defines the target XML documents it can be determined that this XPath expression may be expanded into three location paths—"/a/x/b", "/a/y/b", and "/a/z/b". According to the techniques described herein, the query including this query operator may be rewritten by first expanding the XPath expression into the above three location paths. Then, a first representation of the query is rewritten into a second representation. In the second representation, the certain query operator is replaced by a plurality of operators which include: a first set of operators that is to be performed based each of the three location paths ("/a/x/b", "/a/y/b", and "/a/z/b"), and a second set of operators that is to be performed based on data returned from the first set of operators. The plurality of operators may be determined based on the certain query operator in the same manner as described above with respect to query operators that include descendant axis expression as input argument. Further, the logical and physical query rewrite techniques described above are equally applicable to queries with query operators that include wildcard XPath expressions as input arguments.

Hardware Overview

Figure 3:
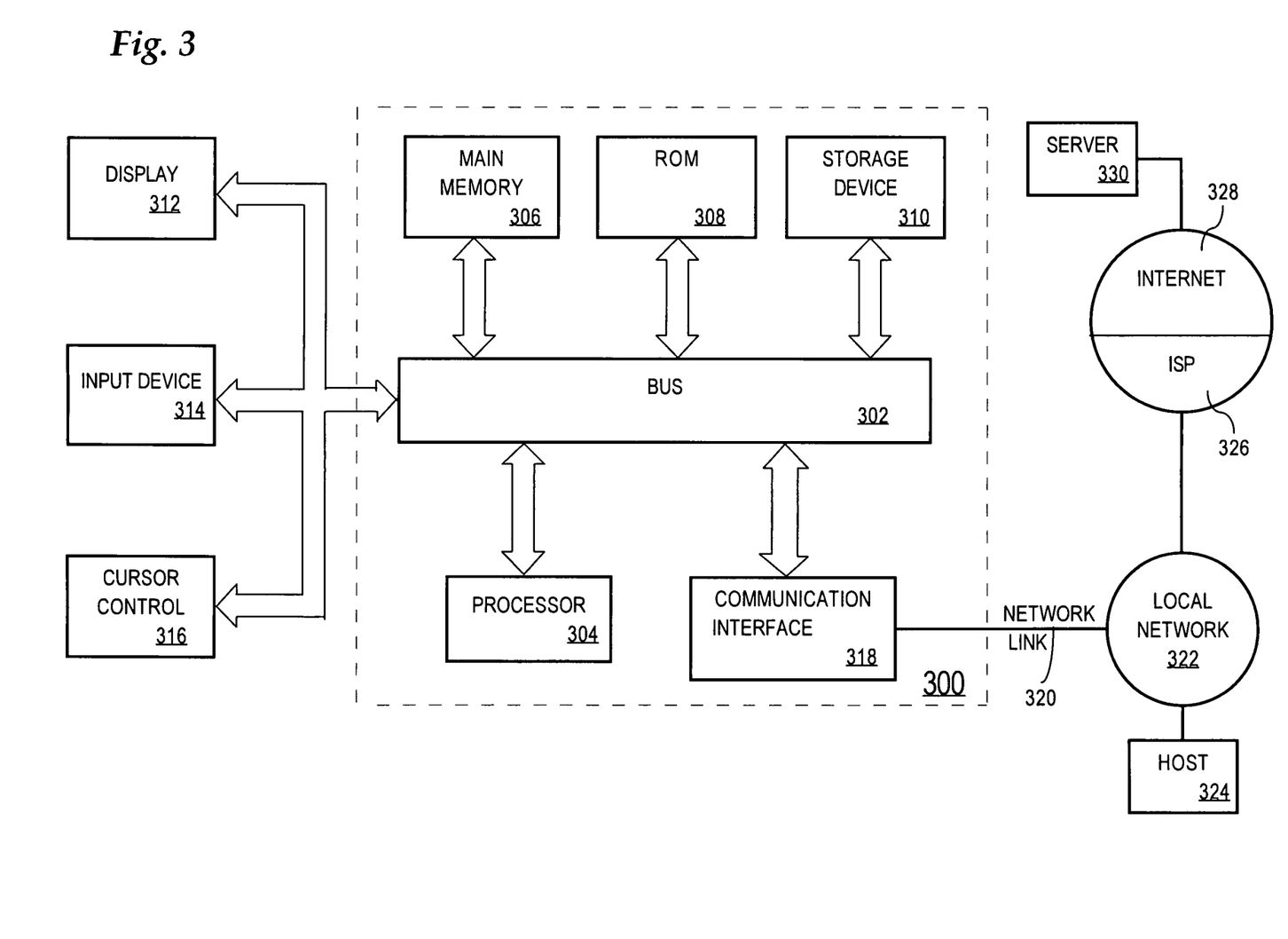
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing queries, the method comprising the computer-implemented steps of:
   receiving a certain query, wherein the certain query includes a certain operator to be performed based on a path expression;
   evaluating the path expression against metadata information that defines the structure of one or more XML documents against which the certain query is to be executed;
   determining that the path expression evaluates to a plurality of location paths into which the path expression can be expanded, wherein each location path of the plurality of location paths identifies a different XML element within the structure of the one or more XML documents;
   generating a first representation of the certain query; and
   rewriting the first representation into a second representation that corresponds to an equivalent query of the certain query, wherein rewriting the first representation comprises:
      expanding the path expression into the plurality of location paths; and
      based on the certain operator, including a plurality of operators in the second representation, wherein the plurality of operators include:
         a first set of operators to be performed based on each of the plurality of location paths, wherein each separate operator in the first set of operators is to be performed on one separate location path of the plurality of location paths; and
         a second set of operators to be performed based on data that is to be returned from each operator included in the first set of operators;
   wherein the steps of the method are performed by one or more computer systems.

2. The method of claim 1, further comprising executing the certain query based on the second representation, wherein executing the certain query includes evaluating one or more operators that are each included in any one of the first set of operators and the second set of operators.

3. The method of claim 1, further comprising:
   based on the second representation, generating the equivalent query to include the plurality of operators; and
   sending the equivalent query to a database server for execution.

4. The method of claim 1, wherein the path expression is an XML Path Language (XPath) expression that includes a descendant axis expression that indicates the plurality of location paths.

5. The method of claim 1, wherein:
the path expression is an XML Path Language (XPath) expression; and
the metadata information is any one of an XML schema and a Document Type Definition (DTD).

6. The method of claim 4, wherein the descendant axis expression identifies nodes that descend from one of a root node and an element node of an XML document, of the one or more XML documents, that is defined in the metadata information.

7. The method of claim 4, wherein:
the plurality of location paths include a first location path that is deterministic and a second location path that is recursive;
the first set of operators include:
first one or more operators to be performed based on the first location path, and
second one or more operators which, when evaluated, perform recursive XPath processing and evaluation based on the second location path; and
the second set of operators include at least one UNION ALL operator that is to be performed based on the data to be returned from the first one or more operators and the second one or more operators.

8. The method of claim 1, wherein the path expression is an XML Path Language (XPath) expression that includes a wildcard expression that indicates the plurality of location paths.

9. The method of claim 1, further comprising executing the query based on the second representation against storage structures in any one of a relational database and an object-relational database.

10. The method of claim 1, wherein the one or more computer systems execute one of a database server and an application server.

11. The method of claim 1, further comprising:
rewriting the second representation into a third representation that corresponds to a second equivalent query of the certain query, wherein rewriting the second representation comprises replacing at least one of the plurality of operators with one or more operators that reference one or more storage structures in one or more databases.

12. The method of claim 11, wherein the one or more storage structures are one or more relational tables that store data of XMLType as object-relational storage.

13. The method of claim 11, wherein the one or more storage structures are one or more relational tables that store data of XMLType as Large Object (LOB) storage.

14. The method of claim 11, wherein the one or more storage structures store one or more of any of path indices and value indices that index data of XMLType.

15. The method of claim 11, further comprising executing the certain query based on the third representation.

16. The method of claim 1, wherein:
the certain operator is an exists-node operator for determining the existence of nodes identified by the path expression;
the first set of operators includes a plurality of exists-node operators, wherein each of the plurality of exists-node operators is to be evaluated based on one of the plurality of location paths; and
the second set of operators includes at least one OR operator, wherein said at least one OR operator is to be evaluated based on results returned by each of the plurality of exists-node operators.

17. The method of claim 1, wherein:
the certain operator is an extract operator for retrieving XML fragments that are identified by the path expression;
the first set of operators includes a plurality of extract operators, wherein each of the plurality of extract operators is to be evaluated based on one of the plurality of location paths; and
the second set of operators includes at least one XMLConcat operator, wherein said at least one XMLConcat operator is to be evaluated based on XML fragments returned by each of the plurality of extract operators.

18. The method of claim 1, wherein:
the certain operator is an XMLTable construct for storing a set of XML fragments into a relational table, wherein each of the set of XML fragments is identified by the path expression;
the first set of operators includes a plurality of extract operators, wherein each of the plurality of extract operators is to be evaluated based on one of the plurality of location paths; and
the second set of operators includes:
an XMLConcat operator, wherein the XMLConcat operator is to be evaluated by concatenating XML fragments that are returned by each of the plurality of extract operators; and
at least one extract-value operator that is to be evaluated based on the content of one or more XML elements that are included in the concatenated XML fragments to be returned by the XMLConcat operator.

19. The method of claim 18, further comprising:
rewriting the second representation into a third representation that corresponds to a second equivalent query of the certain query, wherein rewriting the second representation comprises:
replacing the plurality of extract operators with a plurality of scalar subqueries, wherein each extract operator is replaced by a scalar subquery that is to be evaluated against a storage structure that stores the content of a single XML element identified by one of the plurality of location paths; and
in the second set of operators, replacing the XMLConcat operator with at least one UNION ALL operator, wherein the at least one UNION ALL operator is to be evaluated based on results returned by each of the plurality of scalar subqueries.

20. A machine-readable volatile or non-volatile medium storing one or more sequences of instructions which, when executed by one or more processors, cause the one or more processors to perform steps comprising:
receiving a certain query, wherein the certain query includes a certain operator to be performed based on a path expression;
evaluating the path expression against metadata information that defines the structure of one or more XML documents against which the certain query is to be executed;
determining that the path expression evaluates to a plurality of location paths into which the path expression can be expanded, wherein each location path of the plurality of location paths identifies a different XML element within the structure of the one or more XML documents;
generating a first representation of the certain query; and
rewriting the first representation into a second representation that corresponds to an equivalent query of the certain query, wherein rewriting the first representation comprises:

expanding the path expression into the plurality of location paths; and based on the certain operator, including a plurality of operators in the second representation, wherein the plurality of operators include:

a first set of operators to be performed based on each of the plurality of location paths, wherein each separate operator in the first set of operators is to be performed on one separate location path of the plurality of location paths; and a second set of operators to be performed based on data that is to be returned from each operator included in the first set of operators.

21. The machine-readable medium of claim 20, wherein the one or more sequences of instructions further comprise instructions which, when executed by the one or more processors, cause executing the certain query based on the second representation, wherein executing the certain query includes evaluating one or more operators that are each included in any one of the first set of operators and the second set of operators.

22. The machine-readable medium of claim 20, wherein the one or more sequences of instructions further comprise instructions which, when executed by the one or more processors, cause:

based on the second representation, generating the equivalent query to include the plurality of operators; and sending the equivalent query to a database server for execution.

23. The machine-readable medium of claim 20, wherein the path expression is an XML Path Language (XPath) expression that includes a descendant axis expression that indicates the plurality of location paths.

24. The machine-readable medium of claim 20, wherein:

the path expression is an XML Path Language (XPath) expression; and the metadata information is any one of an XML schema and a Document Type Definition (DTD).

25. The machine-readable medium of claim 23, wherein the descendant axis expression identifies nodes that descend from one of a root node and an element node of an XML document, of the one or more XML documents, that is defined in the metadata information.

26. The machine-readable medium of claim 23, wherein:

the plurality of location paths include a first location path that is deterministic and a second location path that is recursive;

the first set of operators include:

first one or more operators to be performed based on the first location path, and second one or more operators which, when evaluated, perform recursive XPath processing and evaluation based on the second location path; and the second set of operators include at least one UNION ALL operator that is to be performed based on the data to be returned from the first one or more operators and the second one or more operators.

27. The machine-readable medium of claim 20, wherein the path expression is an XML Path Language (XPath) expression that includes a wildcard expression that indicates the plurality of location paths.

28. The machine-readable medium of claim 20, wherein the one or more sequences of instructions further comprise instructions which, when executed by the one or more processors, cause executing the query based on the second representation against storage structures in any one of a relational database and an object-relational database.

29. The machine-readable medium of claim 20, further comprising a set of instructions which, when executed by the one or more processors, cause the one or more processors to execute one of a database server and an application server, wherein the one or more sequences of instructions are included in the set of instructions.

30. The machine-readable medium of claim 20, wherein the one or more sequences of instructions further comprise instructions which, when executed by the one or more processors, cause:

rewriting the second representation into a third representation that corresponds to a second equivalent query of the certain query, wherein rewriting the second representation comprises replacing at least one of the plurality of operators with one or more operators that reference one or more storage structures in one or more databases.

31. The machine-readable medium of claim 30, wherein the one or more storage structures are one or more relational tables that store data of XMLType as object-relational storage.

32. The machine-readable medium of claim 30, wherein the one or more storage structures are one or more relational tables that store data of XMLType as Large Object (LOB) storage.

33. The machine-readable medium of claim 30, wherein the one or more storage structures store one or more of any of path indices and value indices that index data of XMLType.

34. The machine-readable medium of claim 30, wherein the one or more sequences of instructions further comprise instructions which, when executed by the one or more processors, cause executing the certain query based on the third representation.

35. The machine-readable medium of claim 20, wherein:

the certain operator is an exists-node operator for determining the existence of nodes identified by the path expression;

the first set of operators includes a plurality of exists-node operators, wherein each of the plurality of exists-node operators is to be evaluated based on one of the plurality of location paths; and the second set of operators includes at least one OR operator, wherein said at least one OR operator is to be evaluated based on results returned by each of the plurality of exists-node operators.

36. The machine-readable medium of claim 20, wherein:

the certain operator is an extract operator for retrieving XML fragments that are identified by the path expression;

the first set of operators includes a plurality of extract operators, wherein each of the plurality of extract operators is to be evaluated based on one of the plurality of location paths; and the second set of operators includes at least one XMLConcat operator, wherein said at least one XMLConcat operator is to be evaluated based on XML fragments returned by each of the plurality of extract operators.

37. The machine-readable medium of claim 20, wherein:

the certain operator is an XMLTable construct for storing a set of XML fragments into a relational table, wherein each of the set of XML fragments is identified by the path expression;

the first set of operators includes a plurality of extract operators, wherein each of the plurality of extract operators is to be evaluated based on one of the plurality of location paths; and the second set of operators includes:
- an XMLConcat operator, wherein the XMLConcat operator is to be evaluated by concatenating XML fragments that are returned by each of the plurality of extract operators; and
- at least one extract-value operator that is to be evaluated based on the content of one or more XML elements that are included in the concatenated XML fragments to be returned by the XMLConcat operator.

38. The machine-readable medium of claim 37, wherein the one or more sequences of instructions further comprise instructions which, when executed by the one or more processors, cause:
- rewriting the second representation into a third representation that corresponds to a second equivalent query of the certain query, wherein rewriting the second representation comprises:
  - replacing the plurality of extract operators with a plurality of scalar subqueries, wherein each extract operator is replaced by a scalar subquery that is to be evaluated against a storage structure that stores the content of a single XML element identified by one of the plurality of location paths; and
- in the second set of operators, replacing the XMLConcat operator with at least one UNION ALL operator, wherein the at least one UNION ALL operator is to be evaluated based on results returned by each of the plurality of scalar subqueries.

* * * * *